US008396504B2

(12) United States Patent
Choumaru et al.

(10) Patent No.: US 8,396,504 B2
(45) Date of Patent: Mar. 12, 2013

(54) MOBILE TERMINAL DEVICE AND CONTROL METHOD FOR SAVING ELECTRIC POWER OF MOBILE TERMINAL DEVICE

(75) Inventors: Takanori Choumaru, Fukuoka (JP); Kouki Shigaki, Fukuoka (JP); Yoshinobu Shimokawa, Fukuoka (JP); Yoshiyuki Jufuku, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 12/886,712

(22) Filed: Sep. 21, 2010

(65) Prior Publication Data

US 2011/0009155 A1 Jan. 13, 2011

Related U.S. Application Data

(63) Continuation of application No. PCT/JP2008/056204, filed on Mar. 28, 2008.

(51) Int. Cl.
*H04B 7/00* (2006.01)

(52) U.S. Cl. .......... 455/522; 455/343.2; 455/343.5; 455/13.4; 455/574; 455/127.1

(58) Field of Classification Search .................. None
See application file for complete search history.

(56) References Cited

U.S. PATENT DOCUMENTS

| 6,067,460 | A | 5/2000 | Alanara et al. |
| 6,337,990 | B1 * | 1/2002 | Koshino .......... 455/574 |
| 7,653,419 | B2 | 1/2010 | Nagasawa |
| 7,773,687 | B2 * | 8/2010 | Yoshida .......... 375/285 |
| 8,013,734 | B2 * | 9/2011 | Saigh et al. .......... 340/539.13 |
| 8,249,132 | B2 | 8/2012 | Tanae |
| 2004/0025182 | A1 * | 2/2004 | Tari et al. .......... 725/61 |
| 2007/0160122 | A1 | 7/2007 | Yoshida |
| 2008/0240006 | A1 * | 10/2008 | Tseng et al. .......... 370/310 |
| 2009/0052504 | A1 * | 2/2009 | Tanae .......... 375/149 |

FOREIGN PATENT DOCUMENTS

| CN | 1183702 A | 6/1998 |
| CN | 1499881 A | 5/2004 |
| CN | 101151832 A | 3/2008 |

(Continued)

OTHER PUBLICATIONS

International Search Report dated Jun. 24, 2008 in corresponding International application No. PCT/JP2008/056204.

(Continued)

*Primary Examiner* — Yuwen Pan
*Assistant Examiner* — Fanghwa Wang
(74) *Attorney, Agent, or Firm* — Smith, Gambrell & Russell, LLP (57) ABSTRACT

A mobile terminal device communicates with a base station in one of a power-saving state in which consumption of power supplied from a built-in power supply is suppressed and a normal state in which the consumption of power supplied from the built-in power supply is not suppressed. The mobile terminal device includes a base station detecting unit that detects a maximum-power received-wave base station of which a received-wave power is maximum, a base-station-change detecting unit that detects whether the maximum-power received-wave base station detected by the base station detecting unit is changed, and a power-saving-state transition control unit that controls transition to the power-saving state when the change of the maximum-power received-wave base station is not detected by the base-station-change detecting unit in a predetermined time in the normal state.

8 Claims, 8 Drawing Sheets

FOREIGN PATENT DOCUMENTS

| | | |
|---|---|---|
| JP | 2002158609 | 5/2002 |
| JP | 2002186009 | 6/2002 |
| JP | 2002368671 | 12/2002 |
| JP | 2003169013 | 6/2003 |
| JP | 2004080584 | 3/2004 |
| JP | 2005064949 | 3/2005 |
| JP | 2005167321 | 6/2005 |

OTHER PUBLICATIONS

Notice of Rejection Japanese Office Action dated Aug. 14, 2012 issued in corresponding Application No. 2010-505128.

First Notification of Office Action dated Dec. 11, 2012 issued in Chinese Office Action Application No. 200880128359.X.

* cited by examiner

MOBILE TERMINAL DEVICE AND CONTROL METHOD FOR SAVING ELECTRIC POWER OF MOBILE TERMINAL DEVICE

CROSS-REFERENCE TO RELATED APPLICATION(S)

This application is a continuation of International Application No. PCT/JP2008/056204, filed on Mar. 28, 2008, the entire contents of which are incorporated herein by reference.

FIELD

The embodiments discussed herein are directed to a mobile terminal device and a control method for saving the electric power of the mobile terminal device.

BACKGROUND

A mobile terminal as represented by a mobile phone terminal has a characteristic that a user can call and communicate while the user moves. Therefore, when the owner who holds the mobile terminal device moves away from a base station by which the mobile terminal device can communicate at the time and thus an electric wave received from the base station becomes weak, a hand over control is performed for switching the base stations from the current one to another one that is located at the destination of the owner and from which the mobile terminal device can receive a strong electric wave.

To perform a hand over, a mobile terminal device has a function for detecting the state of an electric wave received from a peripheral base station other than a base station that is currently communicating with the mobile terminal device. A smooth hand over can be realized by constant operation of this function.

An electric power supplied from the built-in power supply of the mobile terminal device is consumed to perform the hand over control and the function for detecting the state of an electric wave received from the peripheral base station other than the base station that is currently communicating with the mobile terminal device.

Moreover, a recent mobile terminal device mounts thereon an application executing unit that executes various applications, separately from a wireless processing unit for communication. The mobile terminal device consumes a large amount of power to operate these functions.

The mobile terminal device operates as described above while consuming a limited electric power supplied from the built-in power supply of the mobile terminal device. In the time of emergency as in the event of disasters, the limited electric power of power supply is consumed rapidly and the mobile terminal device stops operating if the mobile terminal device consumes the electric power in the same manner as in the normal time; because in such case, the built-in power supply cannot be charged from a power supply and the electric power cannot be changed to a new power supply charged with sufficient power.

The mobile terminal device is a useful communication tool at the time of emergency such as disasters, for example, and notifies the base station of the position of the device itself. Hence, various attempts have been made to suppress the power consumption of the built-in power supply to extend the operating time of the mobile terminal device as much as possible and to make the mobile terminal device effectively function as a communication tool at the time of disasters.

According to one conventional technique, for example, in the case of emergency such as disasters, the base station instructs the mobile terminal device that is present near the base station to switch to a power-saving mode. On receiving the instruction, the mobile terminal device intermittently transmits and receives information to and from the base station. Thus, the mobile terminal device can suppress the power consumption of the built-in power supply. Such a conventional technique is disclosed in, for example, Japanese Laid-open Patent Publication No. 2002-158609.

In the conventional technique described above, the mobile terminal device switches its modes to a power-saving mode in response to the instruction from a base station. Hence, it is necessary to modify the configurations of both the base station and the mobile terminal device.

Moreover, though in the case of widespread disaster, the power consumption of a built-in power supply can be suppressed in response to the instruction provided from a base station; in the case of disaster inflicted only on the owner of the mobile terminal device (for example, losing a way in the mountains), there would be no instruction from the base station, and hence, the power consumption of a built-in power supply cannot be suppressed.

Moreover, though the power consumption of a built-in power supply can be suppressed compared with normal times, the mobile terminal device still consumes the electric power of the built-in power supply because of the transmission/reception of unnecessary information caused by the intermittent transmission/reception of information between the mobile terminal device and the base station.

SUMMARY

According to an aspect of an embodiment of the invention, a mobile terminal device communicates with a base station in one of a power-saving state in which consumption of power supplied from a built-in power supply is suppressed and a normal state in which the consumption of power supplied from the built-in power supply is not suppressed, and the mobile terminal device includes: a base station detecting unit that detects a maximum-power received-wave base station of which a received-wave power is maximum; a base-station-change detecting unit that detects whether the maximum-power received-wave base station detected by the base station detecting unit is changed; and a power-saving-state transition control unit that controls transition to the power-saving state when the change of the maximum-power received-wave base station is not detected by the base-station-change detecting unit in a predetermined time in the normal state.

According to another aspect of an embodiment of the invention, a control method for saving electric power of a mobile terminal device that communicates with a base station in one of a power-saving state in which consumption of power supplied from a built-in power supply is suppressed and a normal state in which the consumption of power supplied from the built-in power supply is not suppressed, the control method includes: detecting a maximum-power received-wave base station of which a received-wave power is maximal; detecting whether the maximum-power received-wave base station detected at the base station detecting is changed; and controlling transition to the power-saving state when the change of the maximum-power received-wave base station is not detected at the base-station-change detecting in a predetermined time in the normal state.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. In a first and second embodiment, the mobile terminal device is a mobile phone terminal. However, the present invention is not limited to this. The mobile terminal device may be a device that can communicate with a communication device of the other party by wirelessly communicating with a base station, for example, a personal handy-phone system (PHS) terminal, a personal digital assistant (PDA) terminal, or a portable personal computer that has a communication function.

In the following embodiments, a power-saving mode refers to a state where the mobile terminal device is controlled to suppress the power consumption, and a normal mode refers to a state that is not the power-saving mode.

Figure 1A:
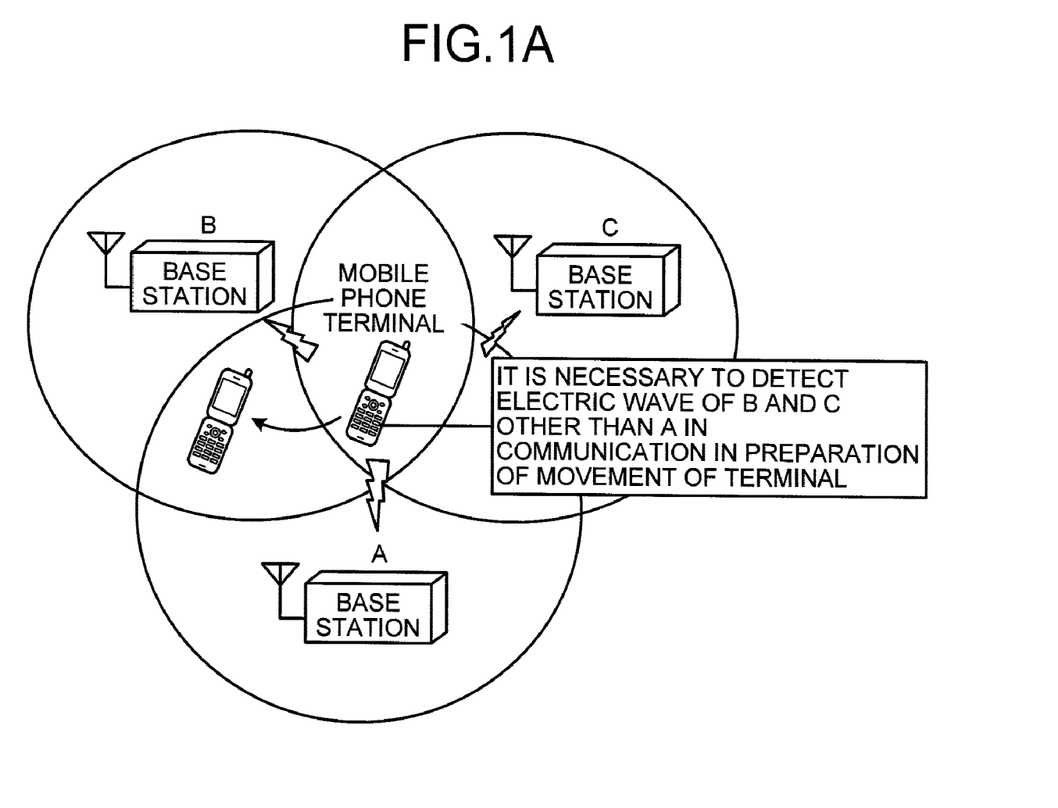
FIG. 1A is a diagram explaining the outline of communication between a mobile phone terminal and a base station.
Figure 1B:
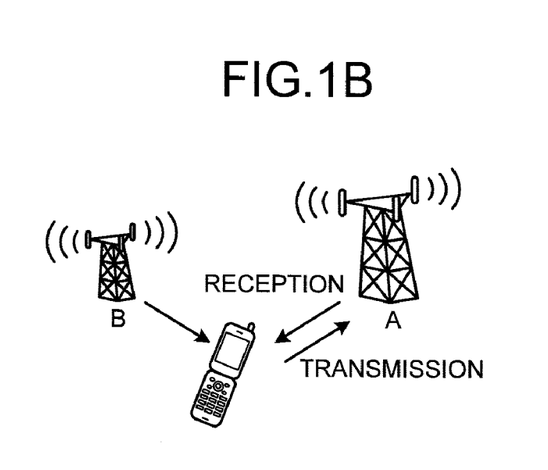
FIG. 1B is another diagram explaining the outline of communication between the mobile phone terminal and the base station.

Prior to the description of an embodiment, the outline of communication between the mobile phone terminal and the base station will be described. FIGS. 1A and 1B are diagrams explaining the outline of communication between a mobile phone terminal and base stations. The mobile phone terminal has a characteristic that a user can call an intended party while the user moves. Therefore, if the mobile phone terminal moves away from a base station (base station A in FIGS. 1A and 1B) that is currently performing communication, and thus an electric wave becomes weak, the mobile phone terminal performs communication by switching from the base station A to another base station (base station B in FIGS. 1A and 1B) that is located at a destination and from which a strong electric wave is received. This technique is called a "hand over" which is a well-known technique of the mobile phone terminal.

To realize the hand over, a mobile phone terminal has a function of constantly detecting the state of an electric wave between the mobile phone terminal and a peripheral base station different from a current base station while communicating with the current base station. However, to realize the hand over, the mobile phone terminal constantly consumes an electric power. Therefore, even if the mobile phone terminal does not make a call or perform packet communication, the limited power of a built-in battery is exhausted with the passage of time.

In the case of emergency such as disasters, the built-in battery of the mobile phone terminal cannot be charged in many cases. As described above, unless the built-in battery is charged, the mobile phone terminal becomes inoperable because the power supply is exhausted with the passage of time. On the other hand, the mobile phone terminal can be an effective communication tool in the case of emergency. However, the exhaustion of the electric power of a built-in battery makes it ineffective.

An object of an embodiment described below is to provide a mobile phone terminal that solves a conflicting problem as described above and that suppresses the power consumption of a built-in battery as much as possible in the case of emergency to thereby function as an effective communication tool over longer time.

Figure 2:
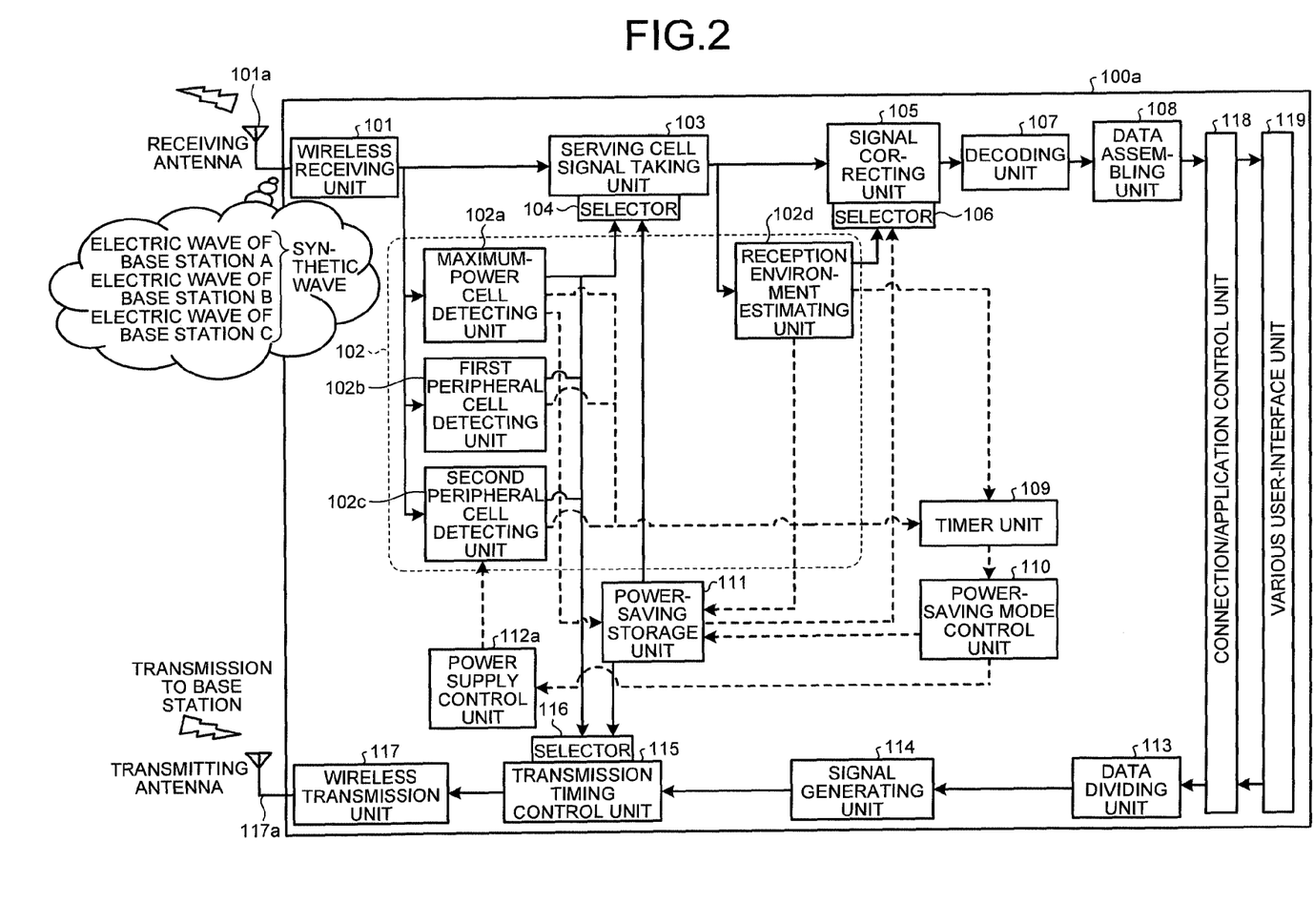
FIG. 2 is a functional block diagram illustrating the configuration of a mobile terminal device according to a first embodiment.
Figure 3A:
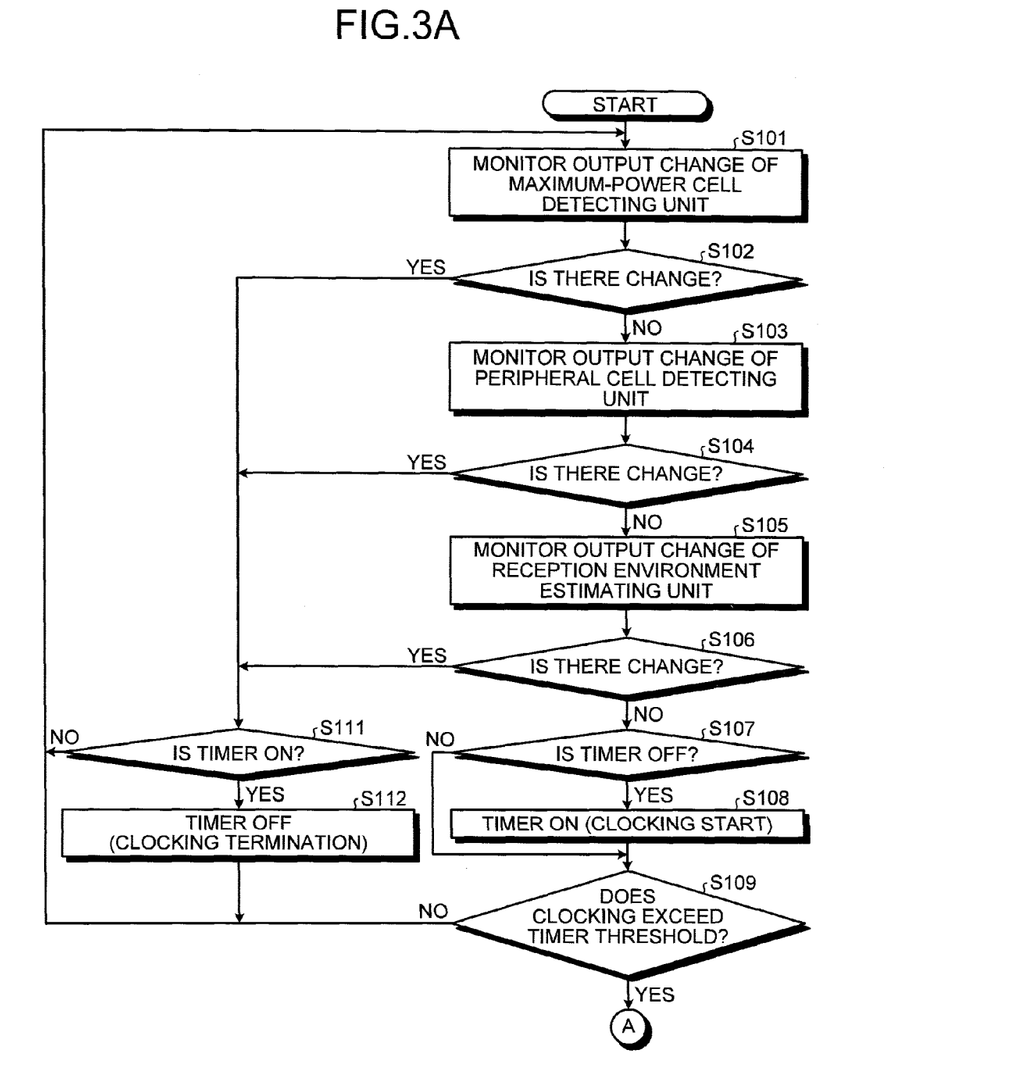
FIGS. 3A and 3B are flowcharts illustrating a power-saving control processing procedure that is executed in the mobile terminal device according to the first embodiment.
Figure 3B:
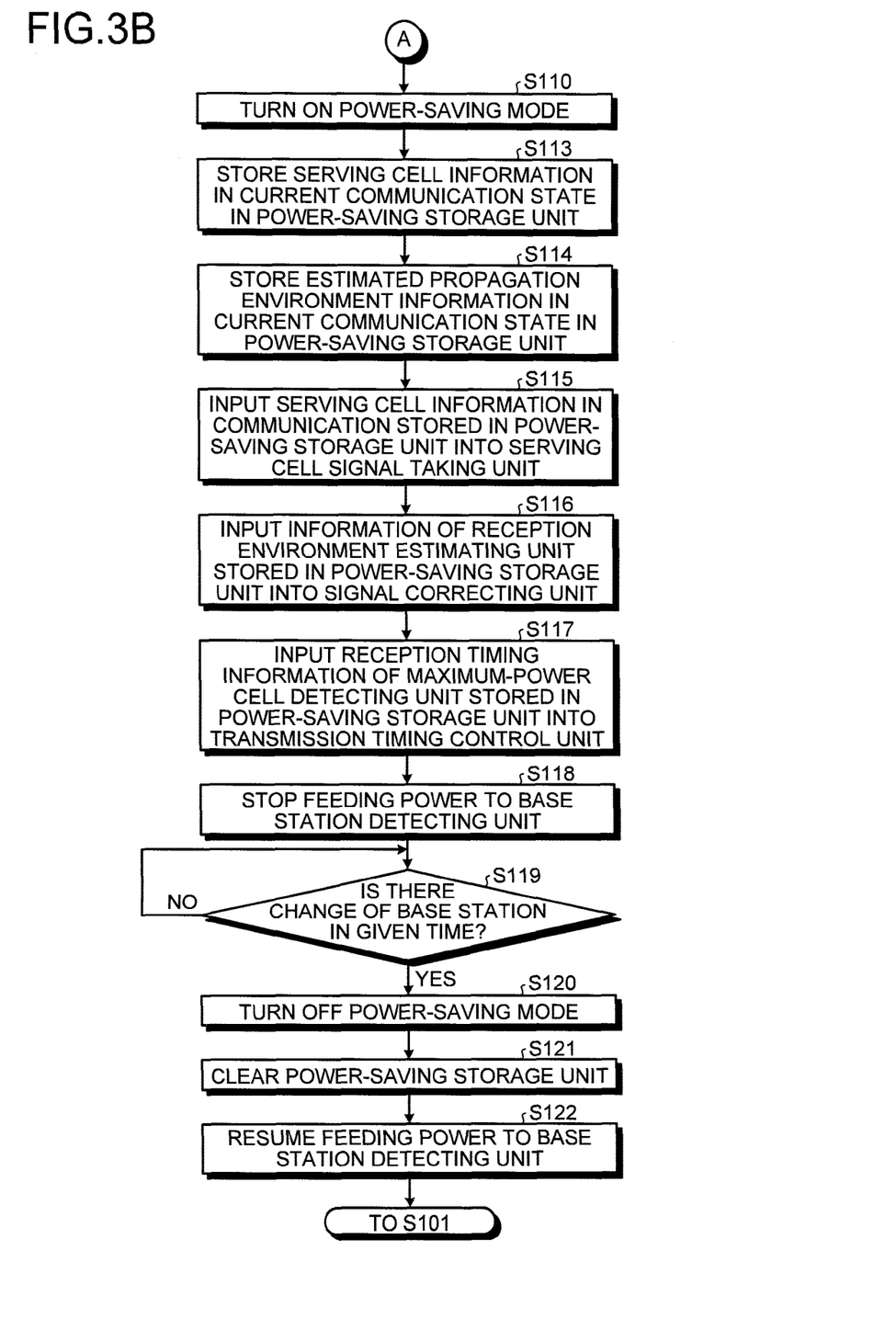

With reference to FIGS. 2 and 3, a first embodiment will be explained as an example of the embodiment. Hereinafter, a coverage area of one base station is referred to as a cell. FIG. 2 is a functional block diagram illustrating the configuration of a mobile phone terminal 100a according to the first embodiment.

As illustrated in FIG. 2, the mobile phone terminal 100a according to the first embodiment includes a wireless receiving unit 101 that receives a synthetic wave of electric waves from, for example, a base station A, a base station B, and a base station C via a receiving antenna 101a.

In the mobile phone terminal 100a, the wireless receiving unit 101 converts the synthetic wave of the received electric waves (RF (Radio Frequency) signals) into a baseband signal, and inputs the baseband signal into a maximum-power cell detecting unit 102a, a first peripheral cell detecting unit 102b, a second peripheral cell detecting unit 102c, and a serving cell signal taking unit 103.

The maximum-power cell detecting unit 102a detects the signal lead position and received power value of each cell included in the received synthetic wave and decides the cell of a base station that outputs an electric wave corresponding to a maximum-power baseband signal as a serving cell so as to allow communication with the base station that outputs an electric wave corresponding to a maximum-power baseband signal.

Then, the maximum-power cell detecting unit 102a inputs serving cell information for identifying a serving cell into a selector 104 of the serving cell signal taking unit 103 and a selector 116 of a transmission timing control unit 115 in such a manner that a baseband signal corresponding to an electric wave of the base station having the serving cell can be separated from the synthetic wave.

Each of the first peripheral cell detecting unit 102b and the second peripheral cell detecting unit 102c detects a peripheral base station having a cell other than the serving cell and detects the signal lead position and received power value of the cell other than the serving cell included in the received synthetic wave to decide the cell of the base station as a peripheral cell.

Then, the maximum-power cell detecting unit 102a, the first peripheral cell detecting unit 102b, and the second peripheral cell detecting unit 102c input serving cell information and peripheral cell information, which can respectively identify the detected serving cell and peripheral cell, into the selector 104 of the serving cell signal taking unit 103, the selector 116 of the transmission timing control unit 115, and a timer unit 109.

Moreover, when the mode is switched to the power-saving mode in accordance with the instruction of a power-saving mode control unit 110, the maximum-power cell detecting unit 102a, the first peripheral cell detecting unit 102b, and the second peripheral cell detecting unit 102c makes a power-saving storage unit 111 store the current serving cell information and peripheral cell information.

The power-saving storage unit 111 is a storage unit that stores various types of information that is used after the transition to the power-saving mode and outputs various types of information to each function part in accordance with an output instruction. The power-saving storage unit 111 is a nonvolatile memory that stores various types of information.

In the normal mode, because serving cell information is not input from the power-saving storage unit 111, the selector 104 and the selector 116 respectively input serving cell information and peripheral cell information output from the maximum-power cell detecting unit 102a, the first peripheral cell detecting unit 102b, and the second peripheral cell detecting unit 102c into the serving cell signal taking unit 103 and the transmission timing control unit 115.

The serving cell signal taking unit 103 takes out a baseband signal (analog signal) based on the electric wave of the base station having a serving cell from the baseband signal obtained by converting the synthetic wave input from the wireless receiving unit 101 on the basis of identification information output from the maximum-power cell detecting unit 102a, the first peripheral cell detecting unit 102b, and the second peripheral cell detecting unit 102c.

The taken baseband signal (hereinafter, "serving cell signal") is input into a signal correcting unit 105 and a reception environment estimating unit 102d.

The reception environment estimating unit 102d is a processing unit that estimates the state of a wireless propagation environment (environmental condition). The estimated propagation environment information estimated by the reception environment estimating unit 102d is input into a selector 106 of the signal correcting unit 105 and the timer unit 109.

Moreover, when the mode is switched to the power-saving mode on the basis of an instruction of the power-saving mode control unit 110, the reception environment estimating unit 102d makes the power-saving storage unit 111 store the current estimated propagation environment information.

If it is the normal mode, because the estimated propagation environment information output from the power-saving storage unit 111 is not input into the selector 106, the selector 106 selects estimated propagation environment information estimated by the reception environment estimating unit 102d and inputs the selected information into the signal correcting unit 105.

The signal correcting unit 105 is an FLL (Frequency Locked Loop)/PLL (Phase Locked Loop) processing unit that corrects the phase and frequency of the serving cell signal on the basis of the estimated propagation environment information estimated by the reception environment estimating unit 102d in the normal mode and on the basis of the estimated propagation environment information input from the power-saving storage unit 111 in the power-saving mode.

A decoding unit 107 performs a decryption process on the serving cell signal corrected by the signal correcting unit 105 to convert the signal into a digital signal. A data assembling unit 108 performs an error correction on data based on the baseband signal processed by the decoding unit 107 and assembles the data to a format that can be processed by a subsequent-stage connection/application control unit 118.

The connection/application control unit 118 has, for example, a configuration that performs communication connection control, application control, and driver control of various types of user interfaces.

A various user-interface unit 119 includes an application executing unit or the like that uses a keyboard, a display, a speaker, a microphone, a camera, a nonvolatile memory, and an integrated circuit, and allows the owner of the mobile phone terminal 100a to use the data transmitted by the received wave.

On the other hand, various types of data input by the user of the mobile phone terminal 100a by using the various user-interface unit 119 is input into a data dividing unit 113 via the connection/application control unit 118.

The data dividing unit 113 divides the data input via the connection/application control unit 118 into data units by which the data can be transmitted by radio. A signal generating unit 114 modulates the data units divided by the data dividing unit 113 to convert the data into an analog signal (baseband signal).

The transmission timing control unit 115 controls a timing at which the analog signal converted by the signal generating unit 114 is transmitted to the base station detected by the maximum-power cell detecting unit 102a in the normal mode.

A wireless transmission unit 117 carries the analog signal, which is input from the transmission timing control unit 115 under the timing control by the transmission timing control unit 115, on an electric wave and transmits the electric wave to the base station corresponding to the serving cell via a transmitting antenna 117a.

The timer unit 109 monitors the change of a serving cell in a given time. In other words, the timer unit 109 monitors whether the owner of the mobile phone terminal 100a moves to the cell of a different base station in a given time.

When the timer unit 109 determines that there is no change in the serving cell in a given time while the mobile phone terminal 100a is in the normal mode, the power-saving mode control unit 110 gives a switching instruction of the mode of the mobile phone terminal 100a from the normal mode to the power-saving mode.

The switching instruction to switch from the normal mode to the power-saving mode given by the power-saving mode control unit 110 is output to the power-saving storage unit 111 and a power supply control unit 112a. The power-saving storage unit 111 inputs the stored serving cell information and peripheral cell information into the selector 104 in accordance with the switching instruction.

Because the serving cell information is input from the power-saving storage unit 111 in the power-saving mode, the selector 104 and the selector 116 respectively input the serving cell information output from the power-saving storage unit 111 into the serving cell signal taking unit 103 and the transmission timing control unit 115.

Moreover, the power-saving storage unit 111 inputs the stored estimated propagation environment information into the selector 106 of the signal correcting unit 105 in accordance with the switching instruction. When the estimated propagation environment information is input from the power-saving storage unit 111, the selector 106 inputs the estimated propagation environment information output from the power-saving storage unit 111 into the signal correcting unit 105.

Moreover, the power-saving storage unit 111 previously stores reception timing information that is used for the decision of transmission timing or the like. In the power-saving mode, the power-saving storage unit 111 outputs the reception timing information to the selector 116. In the power-saving mode, the transmission timing control unit 115 decides the transmission timing of a signal by using the reception timing information.

Then, in accordance with the switching instruction, the power supply control unit 112a stops feeding power to a base station detecting unit 102 that includes the maximum-power cell detecting unit 102a, the first peripheral cell detecting unit 102b, the second peripheral cell detecting unit 102c, and the reception environment estimating unit 102d.

In this way, when the owner of the mobile phone terminal 100a does not move to the cell of a different base station in a given time, the mobile phone terminal 100a stops dynamically monitoring serving cell information, peripheral cell information, and estimated propagation environment information, and can automatically move to the power-saving mode by which the power consumption of the mobile phone terminal 100a can be suppressed by using the static serving cell information, peripheral cell information, and estimated propagation environment information stored in the power-saving storage unit 111.

On the other hand, when the timer unit 109 determines that there is a change in the serving cell in a given time while the mobile phone terminal 100a is in the power-saving mode, the power-saving mode control unit 110 gives a switching instruction of the mode of the mobile phone terminal 100a from the power-saving mode to the normal mode.

The switching instruction from the power-saving mode to the normal mode given by the power-saving mode control unit 110 is output to the power-saving storage unit 111 and the power supply control unit 112a. In accordance with the switching instruction, the power supply control unit 112a resumes feeding power to the base station detecting unit 102 that includes the maximum-power cell detecting unit 102a, the first peripheral cell detecting unit 102b, the second peripheral cell detecting unit 102c, and the reception environment estimating unit 102d.

Then, in accordance with the switching instruction, the power-saving storage unit 111 stops inputting the stored serving cell information and peripheral cell information into the selector 104.

Because serving cell information is not input from the power-saving storage unit 111 in the normal mode, the selector 104 and the selector 116 respectively input the serving cell information output from the maximum-power cell detecting unit 102a into the serving cell signal taking unit 103 and the transmission timing control unit 115.

Moreover, the power-saving storage unit 111 stops inputting the stored estimated propagation environment information into the selector 106 of the signal correcting unit 105 in accordance with the switching instruction. Because the estimated propagation environment information is not input from the power-saving storage unit 111, the selector 106 inputs the estimated propagation environment information output from the reception environment estimating unit 102d into the signal correcting unit 105.

In this way, when the mobile phone terminal 100a is in the power-saving mode and the owner of the mobile phone terminal 100a moves to the cell of a different base station in a given time, the mode can be automatically returned to the normal mode and the dynamic monitoring of serving cell information, peripheral cell information, and estimated propagation environment information is resumed.

Next, a power-saving control process that is executed by the mobile terminal device according to the first embodiment is explained. FIGS. 3A and 3B are flowcharts illustrating a power-saving control processing procedure that is executed by the mobile terminal device according to the first embodiment. It should be noted that a power-saving control process executed by the mobile terminal device according to the first embodiment is a process that continues to be carried out as far as the power supply of the mobile phone terminal 100a is on.

First, as illustrated in FIGS. 3A and 3B, the timer unit 109 monitors the change of the output of the maximum-power cell detecting unit 102a (Step S101). Next, the timer unit 109 determines whether or not there is a change in the output of the maximum-power cell detecting unit 102a (Step S102).

When it is determined that there is no change in the output of the maximum-power cell detecting unit 102a (Step S102: NO), the process control moves to Step S103. When it is determined that there is a change in the output of the maximum-power cell detecting unit 102a (Step S102: YES), the process control moves to Step S111.

Next, the timer unit 109 monitors the change in the outputs of the first peripheral cell detecting unit 102b and the second peripheral cell detecting unit 102c (Step S103). Next, the timer unit 109 determines whether or not there is a change in the output of the first peripheral cell detecting unit 102b or the second peripheral cell detecting unit 102c (Step S104).

When it is determined that there is no change in the output of the first peripheral cell detecting unit 102b or the second peripheral cell detecting unit 102c (Step S104: NO), the process control moves to Step S105. When it is determined that there is a change in the output of the first peripheral cell detecting unit 102b or the second peripheral cell detecting unit 102c (Step S104: YES), the process control moves to Step S111.

Next, the timer unit 109 monitors the change of the output of the reception environment estimating unit 102d (Step S105). Next, the timer unit 109 determines whether or not there is a change in the output of the reception environment estimating unit 102d (Step S106).

When it is determined that there is no change in the output of the reception environment estimating unit 102d (Step S106: NO), the process control moves to Step S107. When it is determined that there is a change in the output of the reception environment estimating unit 102d (Step S106: YES), the process control moves to Step S111.

Next, the timer unit 109 determines whether a timer included in the timer unit 109 is off (Step S107). When it is determined that the timer is off (Step S107: YES), the process control moves to Step S108. When it is not determined that the timer is off (Step S107: NO), the process control moves to Step S109.

At Step S108, the timer unit 109 starts clocking the timer included in the timer unit 109. Next, the timer unit 109 determines whether the clocking time of the timer exceeds a timer threshold value (for example, 30 minutes) (Step S109). When it is determined that the clocking time of the timer exceeds the timer threshold value (Step S109: YES), the process control moves to Step S110. When it is not determined that the clocking time of the timer exceeds the timer threshold value (Step S109: NO), the process control moves to Step S101.

At Step S110, the power-saving mode control unit 110 turns on the power-saving mode. On the other hand, at Step S111, the timer unit 109 determines whether the timer included in the timer unit 109 is on. When it is determined that the timer is on (Step S111: YES), the process control moves to Step S112. When it is not determined that the timer is on (Step S111: NO), the process control moves to Step S101.

At Step S112, the timer unit 109 terminates clocking the timer included in the timer unit 109. When the process terminates, the process control moves to Step S101.

At Step S113, the maximum-power cell detecting unit 102a and/or the first peripheral cell detecting unit 102b and/or the second peripheral cell detecting unit 102c make the power-saving storage unit 111 store serving cell information in a current communication state.

Next, the reception environment estimating unit 102d makes the power-saving storage unit 111 store estimated propagation environment information in a current communication state (Step S114). Next, the power-saving storage unit 111 inputs serving cell information in communication stored in the power-saving storage unit 111 into the selector 104 of the serving cell signal taking unit 103 (Step S115). In response to this, the selector 104 inputs the serving cell information output from the power-saving storage unit 111 into the serving cell signal taking unit 103.

Next, the power-saving storage unit 111 inputs the estimated propagation environment information stored in the power-saving storage unit 111 into the selector 106 of the signal correcting unit 105 (Step S116). In response to this, the selector 106 inputs the estimated propagation environment information output from the power-saving storage unit 111 into the serving cell signal taking unit 103.

Next, the power-saving storage unit 111 inputs the reception timing information of the maximum-power cell detecting unit stored in the power-saving storage unit 111 into the selector 116 of the transmission timing control unit 115 (Step S117). In response to this, the selector 116 inputs the reception timing information output from the power-saving storage unit 111 into the transmission timing control unit 115.

Next, the power supply control unit 112a stops feeding power to the base station detecting unit 102 (Step S118). With this process step, the mobile phone terminal 100a actually moves to the power-saving mode.

Next, the timer unit 109 determines whether there is the change of a base station in a given time (Step S119). When it is determined that there is the change of a base station (Step S119: YES), the process control moves to Step S120. When it is not determined that there is the change of a base station (Step S119: NO), the process repeats Step S119.

At Step S120, the power-saving mode control unit 110 turns off the power-saving mode to switch the mobile phone terminal 100a to the normal mode. Next, the power-saving mode control unit 110 clears the memory content of the power-saving storage unit 111 (Step S121). Next, the power supply control unit 112a resumes feeding power to the base station detecting unit 102. With the resumption of power feeding, the mobile phone terminal 100a actually moves to the normal mode. When the process of Step S122 terminates, the process control moves to Step S101.

According to the first embodiment, the mobile phone terminal 100a is automatically switched to the power-saving mode when the user does not move in a given time. Thus, even if the owner of the mobile phone terminal 100a cannot manipulate the mobile phone terminal 100a for some reasons, the mobile phone terminal 100a can be automatically switched to the power-saving mode, whereby the waste of battery power can be prevented and the standby state can be maintained for a long time.

Moreover, because the mobile phone terminal 100a does not perform transmission/reception with a base station other than a communications partner in the power-saving mode, the waste of battery power can be prevented and the mobile phone terminal 100a can remain in the standby state for longer time period. The above feature suppresses the power consumption of the mobile phone terminal 100a and extends the lifetime of a built-in battery which may contribute to environmental protection in some cases. Moreover, because sufficient electric power can be provided by a small-capacity built-in battery, the present invention may conduce to the miniaturization and lightweighting of a mobile phone terminal.

Figure 4:
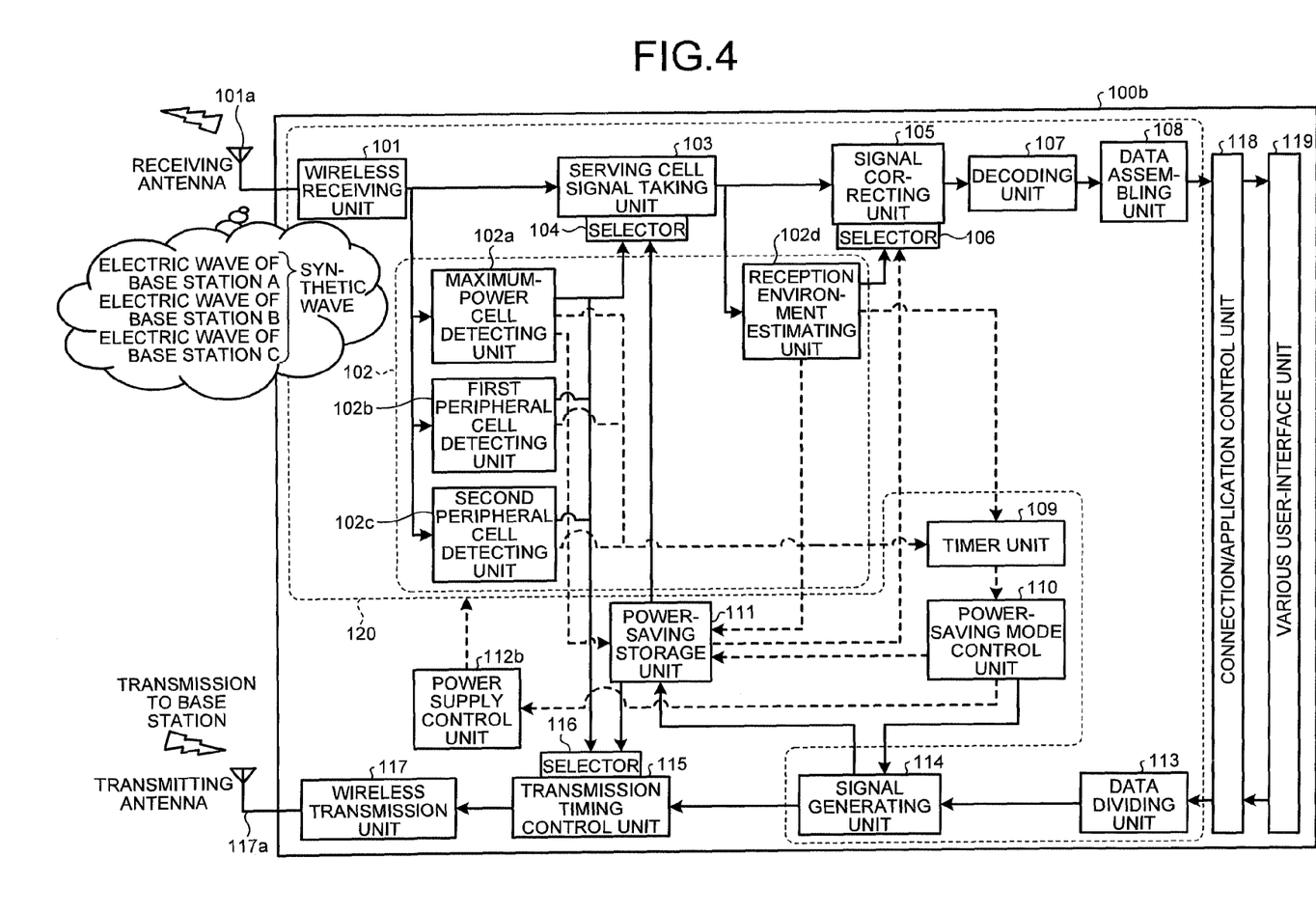
FIG. 4 is a functional block diagram illustrating the configuration of a mobile terminal device according to a second embodiment.

Next, a second embodiment will be explained as another embodiment with reference to FIGS. 4 to 7. The description of the second embodiment is given only on parts different from those of the first embodiment. FIG. 4 is a functional block diagram illustrating the configuration of a mobile phone terminal 100b according to the second embodiment.

The characteristic of the mobile phone terminal 100b according to the second embodiment is that a power supply control unit 112b stops or resumes feeding power to a block 120 that includes all components excepting the transmission timing control unit 115, the wireless transmission unit 117, and the units related to power-saving control, i.e., the timer unit 109, the power-saving mode control unit 110, and the power-saving storage unit 111, compared with the mobile phone terminal 100a according to the first embodiment.

Moreover, before instructing the power supply control unit 112b to stop feeding power to the block 120, the power-saving mode control unit 110 instructs the signal generating unit 114 to generate transmission data for emergency (including a preamble and a payload in which data for emergency is stored) and make the power-saving storage unit 111 store the generated transmission data for emergency.

After the signal generating unit 114 makes the power-saving storage unit 111 store the transmission data for emergency, power feeding to the signal generating unit 114 is stopped by the power supply control unit 112b.

The power-saving storage unit 111 inputs the transmission data for emergency stored in the power-saving storage unit 111 into the selector 116 of the transmission timing control unit 115 in accordance with the transition instruction to the power-saving mode output from the power-saving mode control unit 110. The selector 116 inputs the transmission data for emergency input from the power-saving storage unit 111 into the transmission timing control unit 115.

The transmission timing control unit 115 decides the transmission timing of transmission data for emergency by using reception timing information stored in the power-saving storage unit 111. Then, the wireless transmission unit 117 transmits the transmission data for emergency to a base station corresponding to a serving cell via the transmitting antenna 117a.

Figure 5A:
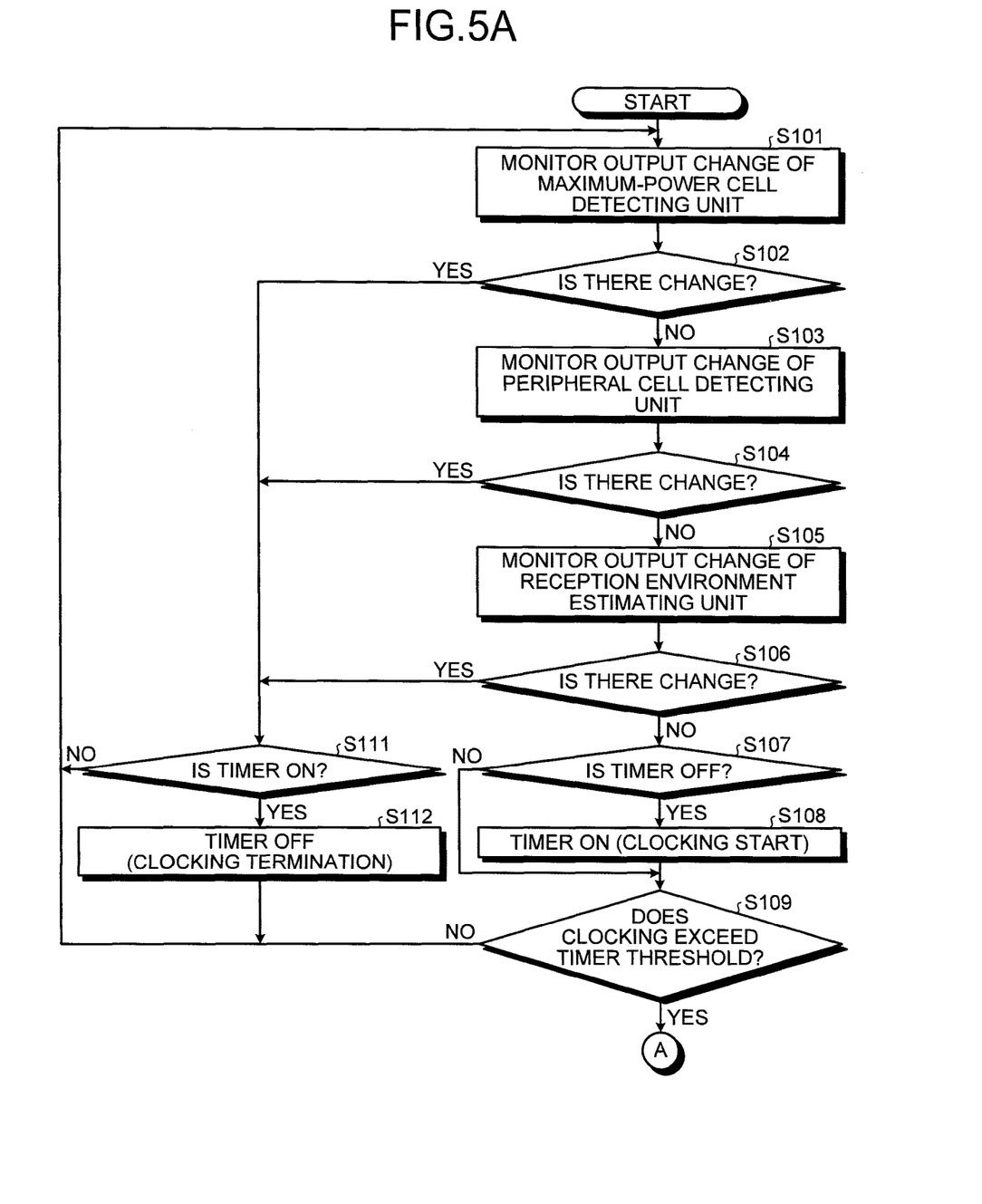
FIGS. 5A and 5B are flowcharts illustrating a power-saving control processing procedure that is executed in the mobile terminal device according to the second embodiment.
Figure 5B:
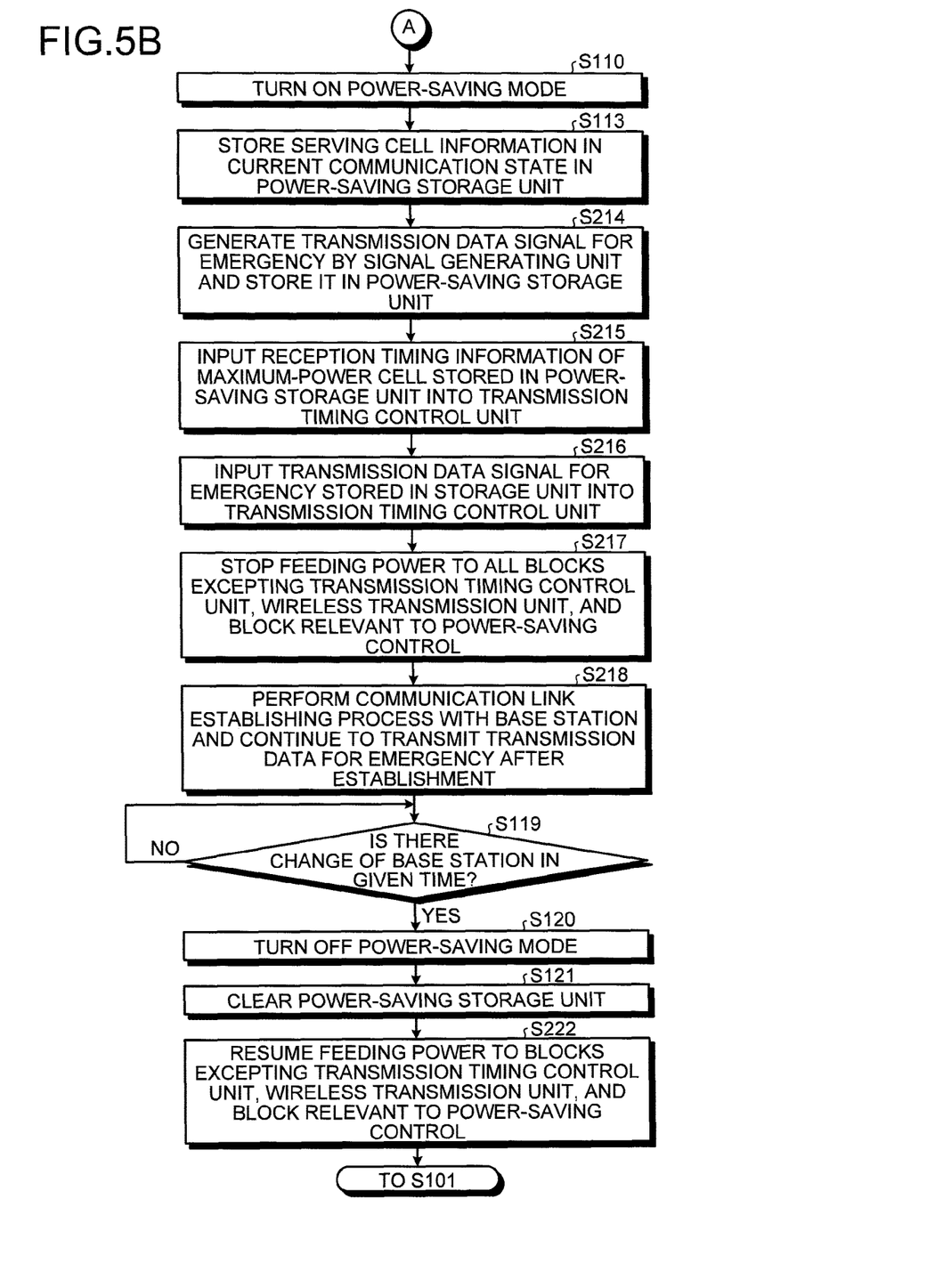

Next, a power-saving control process that is executed by the mobile terminal device according to the second embodiment will be explained. FIGS. 5A and 5B are flowcharts illustrating a power-saving control processing procedure that is executed by the mobile terminal device according to the second embodiment. It should be noted that a power-saving control process executed by the mobile terminal device according to the second embodiment is also a process that continues to be carried out as far as the power supply of the mobile phone terminal 100b is on.

In the flowcharts illustrating the power-saving control processing procedure executed by the mobile terminal device according to the second embodiment, the same processing procedures as those of the flowcharts illustrating the power-saving control processing procedure executed by the mobile terminal device according to the first embodiment have the same step numbers, and the different processing procedures have different step numbers.

Specifically, next to Step S113, the signal generating unit 114 generates transmission data for emergency and makes the power-saving storage unit 111 store the transmission data for emergency and the latest preamble data, according to an instruction from the power-saving mode control unit 110 (Step S214).

Next, the power-saving storage unit 111 inputs the reception timing information of a maximum-power cell stored in the power-saving storage unit 111 into the selector 116 of the transmission timing control unit 115 (Step S215). In response to this, the selector 116 inputs the reception timing information output from the power-saving storage unit 111 into the transmission timing control unit 115.

Next, the power-saving storage unit 111 inputs the latest preamble data and transmission data for emergency stored in the power-saving storage unit 111 into the selector 116 of the transmission timing control unit 115 (Step S216). In response to this, the selector 116 inputs the latest preamble data and transmission data for emergency output from the power-saving storage unit 111 into the transmission timing control unit 115.

Next, the power supply control unit 112b stops feeding power to all blocks (the block 120) excepting the transmission timing control unit 115, the wireless transmission unit 117, and the block relevant to power-saving control, in accordance with an instruction output from the power-saving mode control unit 110 (Step S217).

Next, the transmission timing control unit 115 performs a communication start negotiation (communication link establishing process) with the base station by using the latest preamble data stored in the power-saving storage unit 111, and continues to transmit the transmission data for emergency after the negotiation is succeeded (i.e., communication link establishment) (Step S218). When the process terminates, the process control moves to Step S119.

When the process of Step S121 terminates, the power supply control unit 112b resumes feeding power to all the blocks excepting the transmission timing control unit 115, the wireless transmission unit, and the block relevant to power-saving control (Step S222). When Step S222 terminates, the process control moves to Step S101.

Figure 6:
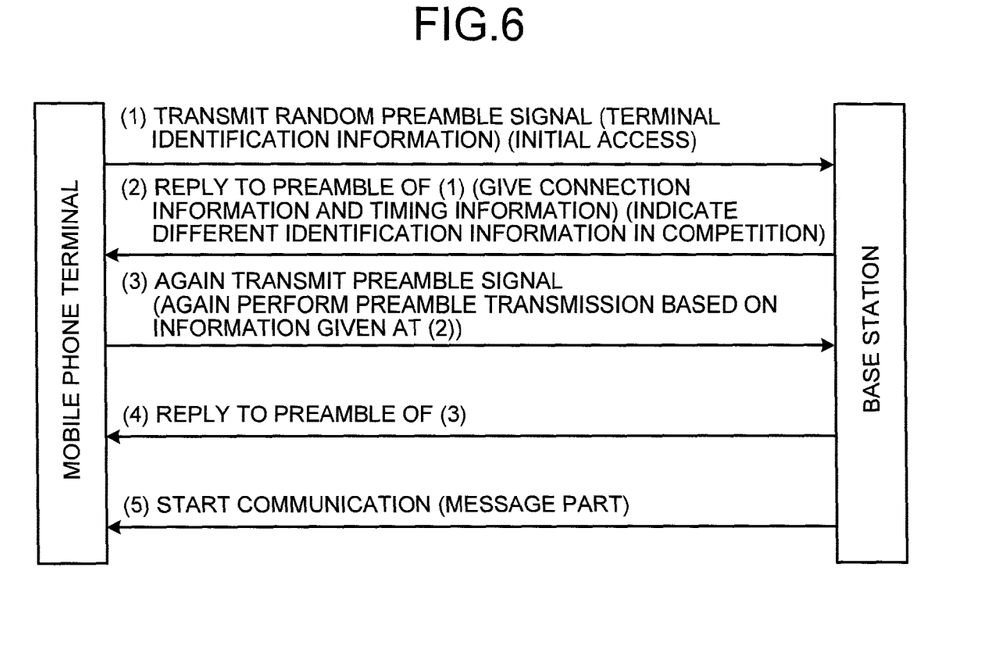
FIG. 6 is a sequence diagram illustrating a link-up between a base station and a mobile terminal device at normal times that is executed in the mobile terminal device according to the second embodiment.

Next, it will be explained about a link establishment between the base station and the mobile terminal device at normal time that is executed by the mobile terminal device according to the second embodiment. FIG. 6 is a sequence diagram illustrating a link establishment between a base station and a mobile terminal device at normal time that is executed by the mobile terminal device according to the second embodiment.

(1) First, after the power supply of a mobile phone terminal is on, the mobile phone terminal transmits random preamble data as an initial access. (2) Next, a base station receives the preamble data, and then replies to the mobile phone terminal by adding inherent connection information and timing information. In this case, when there is a conflict of a preamble, the base station requests another preamble.

(3) The mobile phone terminal transmits preamble data once again on the basis of the information received from the base station. (4) The base station sends back a response to (3). (5) The mobile phone terminal and the base station start communication by using information to which they agree. In the normal mode, communication is maintained by repeating (3) and (4).

Figure 7:
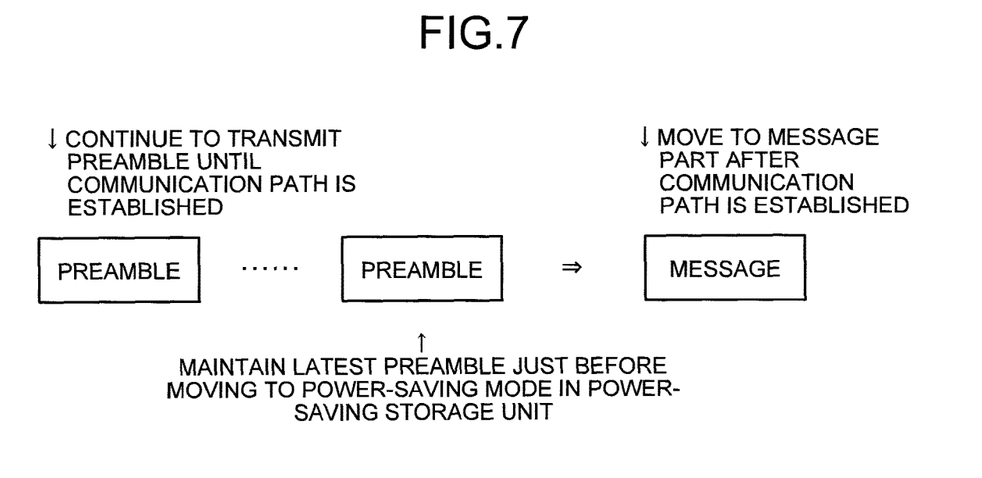
FIG. 7 is a schematic diagram for explaining the transmission of an emergency-transmission-data signal in emergency situations that is executed in the mobile terminal device according to the second embodiment.

Next, the outline of the transmission of an emergency-transmission-data signal in emergency situations is explained. The transmission of the emergency-transmission-data signal is executed by the mobile terminal device according to the second embodiment. FIG. 7 is a diagram explaining the outline of the transmission of the emergency-transmission-data signal executed by the mobile terminal device according to the second embodiment in emergency situations.

(A) In the normal mode, the latest information (transmission information at (3) of FIG. 6) of a preamble that is regularly transmitted is stored in the power-saving storage unit 111. (B) Then, in the transition to the power-saving mode, inherent preamble data for each mobile phone terminal that is stored in the power-saving storage unit 111 is transmitted regularly in a settable/changeable period until a communication link with the base station is established. (C) After the communication link is established, an emergency-transmission-data signal is transmitted regularly in the period as described above.

According to the second embodiment, in the power-saving mode, the position information of the mobile phone terminal 100b can be transmitted over a long time by stopping feeding power to all functions excepting functions relevant to the transmission timing control unit 115, the wireless transmission unit 117, and the power-saving control. Therefore, for example, when a user possesses the mobile phone terminal 100b in the case of distress or disaster, the user may be expected to be rescued earlier since an emergency message transmitted from the mobile phone terminal 100b can serves as a clue.

As above, it has been explained about the embodiments of the present invention. However, the present invention is not limited to those. The present invention may be further realized by various different embodiments within the scope of the technical ideas that are described in CLAIMS. Moreover, it has been explained about the effects of the embodiments. However, the present invention is not limited to those.

Moreover, among the processes described in the present embodiments, the whole or a part of processes that have been automatically performed can be manually performed. Alternatively, the whole or a part of processes that have been manually performed can be automatically performed in a well-known method. Also, processing procedures, control procedures, specific names, and information including various types of data and parameters, which are described in the embodiments, can be arbitrarily changed if not otherwise specified.

Moreover, each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can be dispersed or integrated functionally or physically in an optional unit in accordance with various types of loads or operating conditions.

Furthermore, all or a part of the process functions performed by each device may be realized by a CPU (Central Processing Unit) (or microcomputer such as MPU (Micro Processing Unit) or MCU (Micro Controller Unit)) and a program that is analyzed and executed by the CPU (or microcomputer such as MPU or MCU), or may be realized by a hardware by wired logic.

As described above, according to an aspect of the present invention, in the mobile terminal device and the control method for saving the electric power of the mobile terminal device, the mobile terminal device can wirelessly communicate with a conventional base station, can autonomously switch its mode to the power-saving mode, and can suppress the power consumption of a built-in power supply without transmitting and receiving unnecessary information to and from the base station. In particular, in the case of disasters, the mobile terminal device can suppress the power consumption of the built-in power supply and further extend the operating time of the mobile terminal device to make the mobile terminal device function effectively as a communication tool in the case of disasters.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device that communicates with a base station in one of a power-saving state in which consumption of power supplied from a built-in power supply is suppressed and a normal state in which the consumption of power supplied from the built-in power supply is not suppressed, the mobile terminal device comprising:
    a base station detecting unit that detects a maximum-power received-wave base station of which a received-wave power is maximum;
    a base-station-change detecting unit that detects whether the maximum-power received-wave base station detected by the base station detecting unit is changed;
    a power-saving-state transition control unit that controls transition to the power-saving state when the change of the maximum-power received-wave base station is not detected by the base-station-change detecting unit in a predetermined time in the normal state;
    a peripheral base station detecting unit that detects a peripheral base station of the maximum-power received-wave base station detected by the base station detecting unit;
    a reception timing acquiring unit that acquires a reception timing of the received wave output from the maximum-power received-wave base station;
    a reception environment estimating unit that estimates a reception environment of the received wave;
    a power-saving-state transition-information storing unit that stores the maximum-power received-wave base station detected by the base station detecting unit, the peripheral base station detected by the peripheral base station detecting unit, the reception timing of the received wave acquired by the reception timing acquiring unit, and the reception environment of the received wave estimated by the reception environment estimating unit, when the transition control to the power-saving state is performed by the power-saving-state transition control unit;
    a reception processing unit that receives and processes an electric wave output from the maximum-power received-wave base station; and
    a transmission processing unit that transmits and processes a transmission wave to be transmitted to the base station, wherein
    the power-saving-state transition control unit stops feeding power to the base station detecting unit, the reception timing acquiring unit, and the reception environment estimating unit when moving to the power-saving state,
    the reception processing unit takes out, in the normal state, a baseband signal from the received and processed electric wave output from the maximum-power received-wave base station on the basis of the maximum-power received-wave base station detected by the base station detecting unit and the peripheral base station detected by the peripheral base station detecting unit and takes out, when the normal state are moved to the power-saving state, the baseband signal from the received and processed electric wave output from the maximum-power received-wave base station on the basis of the maximum-power received-wave base station and the peripheral base station that are stored in the power-saving-state transition-information storing unit, and
    the transmission processing unit transmits, in the normal state, the transmission wave to the base station on the basis of the reception timing of the received wave acquired by the reception timing acquiring unit and transmits, when the normal state are moved to the power-saving state, the transmission wave to the base station on the basis of the reception timing of the received wave that is stored in the power-saving-state transition-information storing unit.

2. The mobile terminal device according to claim 1, further comprising
    a base-station-change control unit that changes, when the base-station-change detecting unit detects the change of the maximum-power received-wave base station from a first maximum-power received-wave base station to a second maximum-power received-wave base station, a base station performing wireless communication to the second maximum-power received-wave base station, wherein
    the power-saving-state transition control unit stops feeding power to the base station detecting unit, the base-station-change control unit, and the reception environment estimating unit when moving to the power-saving state.

3. The mobile terminal device according to claim 2, further comprising
    a signal-conversion processing unit that divides data to be transmitted to the maximum-power received-wave base station and converts the divided data into a radio signal, wherein
    the signal-conversion processing unit generates an emergency-transmission-data signal and makes the power-saving-state transition-information storing unit store the emergency-transmission-data signal when moving to the power-saving state,
    the power-saving-state transition control unit stops feeding power to the reception processing unit, the base station detecting unit, the base-station-change control unit, and the signal-conversion processing unit when moving to the power-saving state, and
    the transmission processing unit transmits the emergency-transmission-data signal stored in the power-saving-state transition-information storing unit to the base station on the basis of the reception timing of the received wave.

4. The mobile terminal device according to claim 1, further comprising
    a timer unit that detects the maximum-power received-wave base station and detects whether the detected the maximum-power received-wave base station is changed, wherein
    the power-saving-state transition control unit controls transition to the normal state when the timer unit detects the change of the maximum-power received-wave base station in a predetermined time in the power-saving state.

5. A control method for saving electric power of a mobile terminal device that communicates with a base station in one of a power-saving state in which consumption of power supplied from a built-in power supply is suppressed and a normal state in which the consumption of power supplied from the built-in power supply is not suppressed, the control method comprising:

detecting a maximum-power received-wave base station of which a received-wave power is maximal;

detecting whether the maximum-power received-wave base station detected at the base station detecting is changed;

controlling transition to the power-saving state when the change of the maximum-power received-wave base station is not detected at the base-station-change detecting in a predetermined time in the normal state;

detecting a peripheral base station of the maximum-power received-wave base station detected at the base station detecting;

acquiring a reception timing of the received wave output from the maximum-power received-wave base station;

estimating a reception environment of the received wave;

storing the maximum-power received-wave base station detected at the base station detecting, the peripheral base station detected at the peripheral base station detecting, the reception timing of the received wave acquired at the reception timing acquiring, and the reception environment of the received wave estimated at the reception environment estimating in a power-saving-state transition-information storage unit, when the transition control to the power-saving state is performed at the power-saving -state transition controlling;

receiving and processing an electric wave output from the maximum-power received-wave base station; and transmitting and processing a transmission wave to be transmitted to the base station, wherein the power-saving-state transition controlling includes stopping feeding power to a base station detecting unit that performs the base station detecting, a reception timing acquiring unit that performs the reception timing acquiring, and a reception environment estimating unit that performs the reception environment estimating when moving to the power-saving state, the reception processing includes taking out, in the normal state, a baseband signal from the received and processed electric wave output from the maximum-power received-wave base station on the basis of the maximum-power received-wave base station detected at the base station detecting and the peripheral base station detected at the peripheral base station detecting and taking out, when the normal state are moved to the power-saving state, the baseband signal from the received and processed electric wave output from the maximum-power received-wave base station on the basis of the maximum-power received-wave base station and the peripheral base station that are stored in the power-saving-state transition-information storage unit, and the transmission processing includes transmitting, in the normal state, the transmission wave to the base station on the basis of the reception timing of the received wave acquired at the reception timing acquiring and transmitting, when the normal state are moved to the power-saving state, the transmission wave to the base station on the basis of the reception timing of the received wave that is stored in the power-saving-state transition-information storage unit.

6. The control method according to claim 5, further comprising changing, when the change of the maximum-power received-wave base station from a first maximum-power received-wave base station to a second maximum-power received-wave base station is detected at the base-station-change detecting, a base station performing wireless communication to the second maximum-power received-wave base station, wherein the power-saving-state transition controlling includes stopping feeding power to a base station detecting unit that performs the base station detecting, a base-station-change control unit that performs the base-station-change controlling, and a reception environment estimating unit that performs the reception environment estimating when moving to the power-saving state.

7. The control method according to claim 5, further comprising dividing data to be transmitted to the maximum-power received-wave base station and converting the divided data into a radio signal, wherein the signal-conversion processing includes generating an emergency-transmission-data signal and makes the power-saving-state transition-information storing unit store the emergency-transmission-data signal when moving to the power-saving state, the power-saving-state transition controlling includes stopping feeding power to a reception processing unit that performs the reception processing, a base station detecting unit that performs the base station detecting, a base-station-change control unit that performs the base-station-change controlling, and a signal-conversion processing unit that performs the signal conversion processing when moving to the power-saving state, and the transmission processing includes transmitting the emergency-transmission-data signal stored in the power-saving-state transition-information storing unit to the base station on the basis of the reception timing of the received wave.

8. The control method according to claim 5, further comprising detecting the maximum-power received-wave base station and detecting whether the detected the maximum-power received-wave base station is changed, using a timer unit, wherein the power-saving-state transition controlling includes controlling transition to the normal state when the change of the maximum-power received-wave base station is detected in a given time in the power-saving state at the base-station-change detecting.

* * * * *